United States Patent [19]

Ahrendt et al.

[11] 4,069,015
[45] Jan. 17, 1978

[54] METHOD OF INHIBITING RUSTING OF SPONGE IRON

[75] Inventors: William A. Ahrendt; David C. Meissner, both of Charlotte, N.C.

[73] Assignee: Midrex Corporation, Charlotte, N.C.

[21] Appl. No.: 614,830

[22] Filed: Sept. 19, 1975

[51] Int. Cl.² ............................................. C23F 9/02
[52] U.S. Cl. .................................. 21/2.5 R; 75/.5 R; 427/216
[58] Field of Search ............... 75/.5 AA, .5 BA, .5 R; 427/216; 21/2.5 R, 2.7 R

[56] References Cited

U.S. PATENT DOCUMENTS

| 2,462,900 | 3/1949 | Riott | 75/.5 BA |
| 3,597,260 | 8/1971 | Segura | 427/216 |
| 3,632,390 | 1/1972 | Bradshaw et al. | 427/216 |
| 3,690,930 | 9/1972 | Mueller et al. | 427/216 |

*Primary Examiner*—W. Stallard
*Attorney, Agent, or Firm*—Ralph H. Dougherty

[57] ABSTRACT

A method for inhibiting rusting of sponge iron or any form of directly reduced iron when contacted by air, water, or other oxidant, by treating the sponge iron with a water soluble alkali metal silicate solution. The resulting product, a sodium silicate treated, rust-resistant metallized iron pellet, is also disclosed.

38 Claims, 4 Drawing Figures

METHOD OF INHIBITING RUSTING OF SPONGE IRON

BACKGROUND OF THE INVENTION

This invention relates to a method for inhibiting oxidation of a reduced metal article. More particularly, the invention relates to a method of inhibiting rusting of sponge iron.

Sponge iron, metallized pellets, briquettes, or reduced metal materials are produced by the direct reduction of ores. Large quantities of metallized iron pellets are made in the direct reduction process wherein particulate iron ore is reduced substantially to metallic iron by direct contact with a reducing gas such as a mixture of hydrogen and carbon monoxide. Throughout this specification and the appended claims, the term "metallized pellets" is intended to include iron bearing pellets such as sponge iron, briquettes, other compacted forms of reduced iron and the like which contain at least 80% of their iron in the metallic state with the balance being virtually all in the form of iron oxide. "Metallized," in this sense, does not mean coated with metal, but means nearly completely reduced to the metallic state. This metallized iron product is suitable for charging directly to a steelmaking furnace such as an electric arc furnace, as a feed material. One of the problems associated with the use of sponge iron as a raw material in steelmaking is its inherent tendency to reoxidize upon exposure to air or water. Hot sponge iron is extremely reactive because of its high surface area and high porosity, and oxidizes spontaneously if contacted by oxygen in any form. Thus sponge iron must be cooled in a reducing or neutral atmosphere. Sponge iron oxidizes even when stored in the open air. Iron oxidizes in dry air to form magnetite by the well-known reaction:

$$3Fe + 2 O_2 \rightarrow Fe_3O_4 \quad (1)$$

This oxidation reaction is very exothermic which can cause a detrimental loss in metallic iron content or metallization, as well as cause a bulk mass of sponge iron to heat up excessively and burn. When water contacts iron in the presence of atmospheric oxygen, rusting occurs in two stages.

The first stage rust, ferrous hydroxide, is formed by the reaction:

$$Fe + H_2O + \tfrac{1}{2} O_2 = Fe(OH)_2 \quad (2)$$

The second and final stage rust, hydrated ferric oxide, is formed by the reaction:

$$2Fe(OH)_2 + H_2O + \tfrac{1}{2} O_2 = Fe_2O_3 \cdot 3H_2O \quad (3)$$

A third reaction takes place which liberates hydrogen. Part of the first stage rust recomposes to form the iron oxide known as magnetite, water, and hydrogen by the reaction:

$$3Fe(OH)_2 = Fe_3O_4 + 2H_2O + H_2 \quad (4)$$

Reactions (2) and (3) are also exothermic. The amount of heat liberated by reacting only approximately 15% of the initial water is capable of supplying the latent heat of evaporation of the remaining 85% of the initial water. Although reaction (4) is slightly endothermic, the cooling effect is negligible. Exposure of a mass of active sponge iron to atmospheric air and moisture will cause rusting with a significant loss of metallization. Such exposure will also produce heat and can raise the temperature of the mass so high that the liberated hydrogen ignites.

Uses of directly reduced sponge iron products are restricted unless such products can be stored in bulk in the open, subject to contact by the elements.

A potential problem is created by transportation of sponge iron in bulk, as in barges or closed containers, such as by ship. Water can enter the holds of most ships wetting the loosely stored material therein. When the material is untreated sponge iron, the water reacts with it as described above, releasing large quantities of hydrogen. Special ventilation procedures are required in order to prevent the buildup of hydrogen in the hold to combustible proportions and minimize the risk of such shipments by water.

Numerous methods have been proposed to prevent reoxidation of sponge iron and to prevent such hydrogen generation. One suggested method is to eliminate the large surface areas by making relatively nonporous aggregates. This is expensive and requires heavy compaction equipment. Another method is to coat the particles with hydrocarbons such as asphalt, plastics, or waxes. These coatings are expensive, difficult to apply, and contaminate the product. Such coatings are easily damaged; for instance, a mere shift of material in its container during transit may rupture the coating thus exposing active iron surfaces to the atmosphere. In such cases, when a fire breaks out, the hydrocarbon coatings actually add to the intensity of the flames. U.S. Pat No. 3,844,764 discloses an effective process for passivation against reoxidation of sponge iron in air in the dry state. However, this process does not prevent rusting when the passivated sponge iron is wetted with water and exposed to air.

It has now been found that by treating sponge iron with a solution of a water soluble alkali metal silicate, such as sodium silicate, the product can be stored for long periods of time in the open, even in rainy weather, or be shipped in open trucks and railroad cars without any significant rusting or loss of metallization. A large mass of the product can be shipped over great distances in a wet hold with such minimal hydrogen generation that shipboard ventilation systems can easily maintain the hydrogen generated well within safe limits. The process which inhibits reoxidation of sponge iron in air, as well as against rusting when wetted with water, consists of wetting the sponge iron with a dilute aqueous solution of liquid alkali metal silicate, preferably followed by drying the wetted sponge iron. The drying step is preferably carried out under oxidizing conditions and at a temperature substantially below the autoignition temperature of sponge iron. During the wetting and drying process, there is no measurable loss in metallization, and when later rewetted with water, there is no measurable rusting or heating. If the drying step is omitted, and the sponge is simply wetted with a dilute aqueous solution of liquid alkali metal silicate, there is no measurable rusting or heating while it is wet. It has been discovered that an aqueous solution of liquid alkali metal silicate is an unexpectedly and exceedingly effective rust inhibitor for sponge iron. Alkali metal silicates are readily removed from sponge iron into slag during the operation of a steelmaking process, and are thus only minimal contaminants.

OBJECTS OF THE INVENTION

It is a principal object of the subject invention to avoid the foregoing and other difficulties of, and objections to, prior practices by the provision of a method for inhibiting rusting of metallic materials which are highly reactive because of their high porosity and the high specific surface area associated therewith.

It is a more specific object of this invention to provide a simple, inexpensive and efficient method for inhibiting rusting of sponge iron.

It is also an object of this invention to provide a sponge iron product which can be stored in the open in wet weather with little or no rusting.

It is a further object of this invention to provide a method for treating sponge iron so that only minimal hydrogen generation will result when the treated material is contacted by water.

It is another object of this invention to provide a method for rendering sponge iron nonreactive when exposed to dry air as well as wet air.

It is also an object of this invention to provide an improved sponge iron product which may be safely transported over long distances by truck, rail, or boat without any additional precautions.

DETAILED DESCRIPTION

Figure 1:
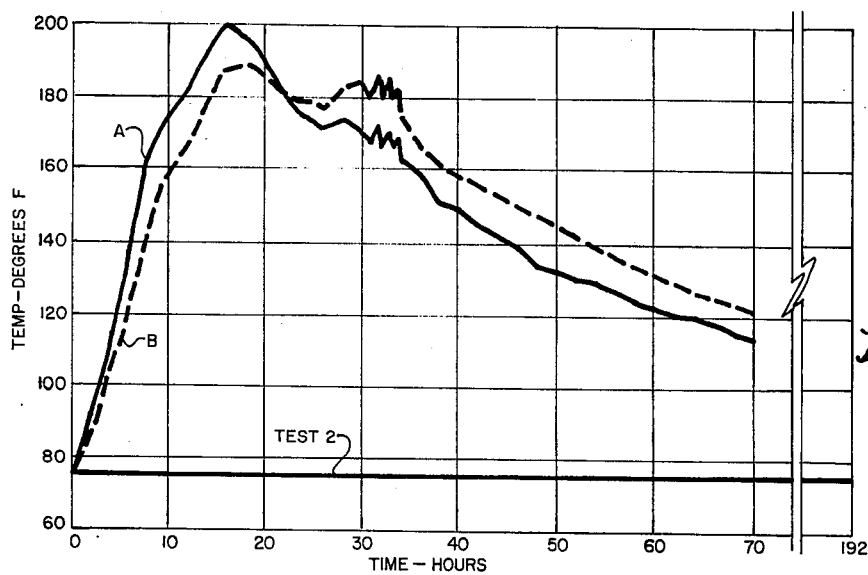
FIG. 1 is a graph showing the temperature of a mass of wetted pellets at various time intervals.

According to the invention, directly reduced pellets or sponge iron are rendered rust resistant by immersing the pellets in an alkali metal silicate solution whereby the entire surface of the pellet is wetted by the solution. The treated product may then be dried, if it is desired, to remove the water from the product; for instance, as a means of reducing weight prior to shipment.

This product is well suited for open storage as well as for shipment in wet containers.

It was completely unexpected that the mere contact of sponge iron, with a low concentration solution of sodium silicate, would lead to such superior results. The theory regarding formation of protective films, to which we subscribe, but do not wish to be held, is as follows:

The iron reacts with the water in the aqueous solution to form, as the solid corrosion product, a positively charged iron hydroxide which immediately removes the negatively charged silica from the solution to form a protective film of amorphous silica gel on the surface of the iron. As soon as the thin surface film is formed, corrosion of the metal surface ceases. Since the film formation is dependent on the presence of corrosion product, and there is no further corrosion product formation after the film is formed, additional buildup of the film is prevented. Thus, the protective film is self-limiting in thickness. The protective film is also self-healing when damaged. Whenever a portion of the film is removed from the surface, corrosion of the exposed surface begins and the film-forming reaction takes place immediately. The electrical potential, between the negatively charged silica and the positively charged iron hydroxide, causes silica to be attracted by the solid surface forming a protective film even in corners and on sharp surfaces. No solution flow is necessary to establish contact with the iron as capillary action of the porous body will suck the sodium silicate solution rapidly into the sponge iron.

Since more silica is present than needed to cover all surfaces, the additional silica in the solution is available to heal films which are damaged by scratching, crushing, or breaking of the metallized product. When the material is dried, the film is not destroyed, but the surplus silica is deposited on the top of the film. Rewetting of the product dissolves the surplus silica and makes it, once again, available for protection of damaged areas.

The treatment solutions of our invention are water soluble, liquid alkali metal silicates. The preferred alkali metal silicate is sodium silicate, although we can use lithium or potassium silicate. We employ aqueous solutions of liquid sodium silicate having a concentration of from 2 to 50 percent by weight. The concentration of the solution may be increased to as high a level as desired; however, no additional benefits are obtained thereby.

Sodium silicate is a generic term for a family of chemicals composed of sodium oxide ($Na_2O$), silica ($SiO_2$), and usually water ($H_2O$). The proportion of $Na_2O$ to $SiO_2$ in sodium silicates is expressed as a weight ratio with the alkali component held at unity. Commercial grades of liquid sodium silicate are usually concentrated for convenient handling. For instance, sodium silicate having a weight ratio of 3.22 can readily be handled up to a solids content of about 39.8% which is equivalent to approximately 43° Baume. This ratio silicate rapidly becomes more viscous as the concentration is increased further which makes it too thick to be handled conveniently at ambient temperatures.

In our experimental work, we utilized a liquid sodium silicate solution having a weight ratio of 3.22, a solids content of 37.6%, (8.90% $Na_2O$ and 28.7% $SiO_2$), a density of 41.0° Baume, and a viscosity of 180 centipoises. Liquid sodium silicate, as the term is used in the examples in this specification, refers to this 37.6% solids sodium silicate solution.

The alkali metal silicate, as used in our invention, must be in liquid form, preferably in aqueous solution, to bring it into contact with the entire surface of each pellet, including any recesses therein.

It has been observed that the treated pellets can be stored in wet weather, dried and wetted repeatedly, without losing their rust-resistant quality.

Tests were conducted to simulate the conditions of partial wetting of a metallized pellet cargo. The test chamber consisted of an enclosed cylinder, 22 inches in diameter and about 100 inches in height, the lower third of the cylinder being insulated on its bottom and sides to simulate the insulating effect of a surrounding mass of pellets. Two ventilation pipes extended vertically into the chamber to simulate auto-ventilation stacks which limited the hydrogen concentration in the free space above the mass of pellets to four percent (4%) which is less than the combustible limit of hydrogen in air. Reactions were monitored by thermocouples and gas sampling devices.

EXAMPLE 1

The test chamber was filled to a depth of 28 inches with 900 pounds of metallized pellets which had been screened to remove the $-\frac{1}{4}$ inch material. Thirty pounds of water was poured on the pellets over an 8 inch diameter area at the center of the top of the mass of pellets. The chamber was closed and sealed except for the ventilation stacks. Thermocouples were inserted into the center of the mass of pellets with Thermocouple A 6 inches below Thermocouple B. The test continued for 70 hours. As shown in FIG. 1, the maximum temperature reached was 200° F, as recorded by Thermocouple A. Two sets of peaks were observed; the first occurring between 15 and 20 hours, and the second between 29 and 33 hours. The maximum temperature reached in the second set was 186° F, as recorded by Thermocouple B.

Figure 2:
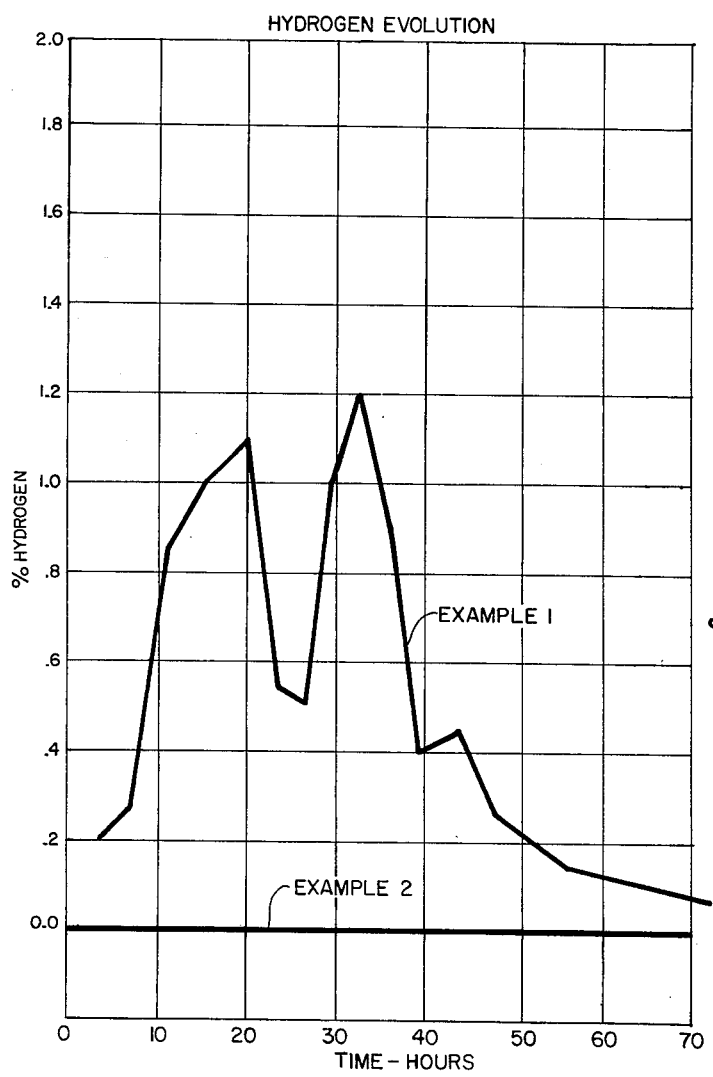
FIG. 2 is a graph showing the rate of hydrogen evolution from a mass of wetted pellets.

The hydrogen evolution is plotted in FIG. 2. The maximum hydrogen evolution coincides approximately with the latter part of each peak temperature period. The average hydrogen evolution rate, over the first 40 hours of the test, was 4 standard cubic feet per hour per long ton of wetted pellets. The maximum hydrogen concentration in the free space above the pellets was 1.2%.

Figure 3:
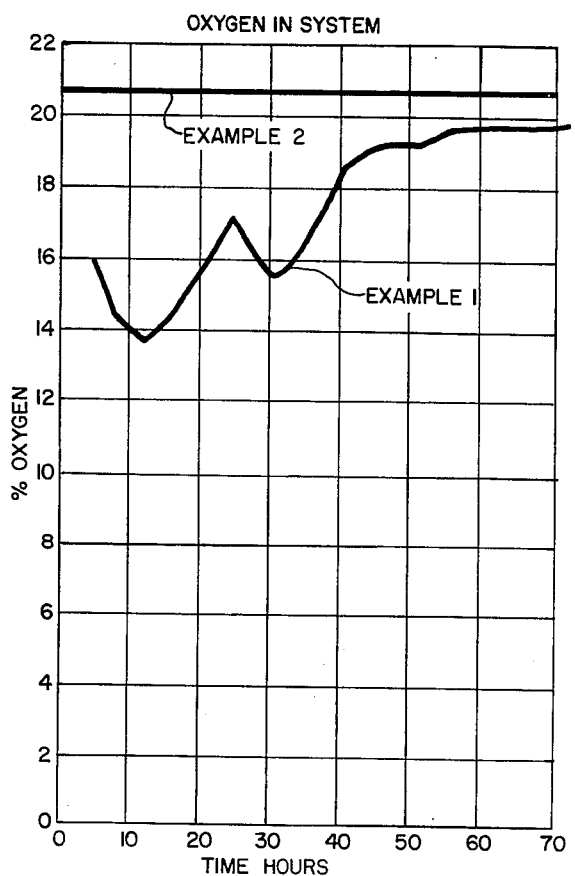
FIG. 3 is a graph showing the amount of oxygen present in the atmosphere above a mass of wetted pellets.

FIG. 3 shows the oxygen present in the system and thereby indicates the rate of oxygen consumption during the test. Again, two peaks occurred coinciding in both cases with the early part of the temperature peaking periods. The average oxygen consumption rate was 25 standard cubic feet per hour of oxygen per long ton (SCFH $O_2$/LT) of wetted pellets over the first 40 hours of the test.

EXAMPLE 2

859 pounds of metallized pellets were dipped in a 50% liquid sodium silicate - 50% water (by weight) solution, drained and dried for one hour at 250° F. Weight gain of the pellets from this treatment was 3.15%, after drying. The sample was not screened and did contain some chips, but very few minus 6-mesh fine material. Thirty pounds of water was poured on the pellets over an 8-inch diameter area at the center top surface of the mass which wetted a truncated conical section of the pellet mass. The system was observed for a period of 192 hours.

Temperatures within the mass of pellets, recorded by both thermocouples, varied no more than one degree from ambient temperature during the entire period (see FIG. 1). Oxygen measurements, taken daily, showed essentially air ranging from 20.8 to 21.0 percent oxygen (see FIG. 3). No flow could be detected at either vent stack which indicates that there was no hydrogen evolution (see FIG. 2). Neither rusting nor discoloration of the metallized pellets could be detected visually when the pellets were removed from the test chamber for redrying.

EXAMPLES 3 THROUGH 10

Eight 20-pound samples of metallized pellets were dipped in aqueous sodium silicate solutions having various water-to-liquid sodium silicate ratios, as set forth in Table 1. The treated pellets were drained, weighed, and oven dried for one hour at 250° F, and weighed a second time to determine the amount of retained solids which are shown in Table 1 as a percentage weight gain. The treated, dried pellets were then dipped in fresh water and drained, and the wet reactivity of each sample was determined in cubic feet of oxygen consumption per hour per long ton (CFH $O_2$/LT) of pellets. The 100 to 1 solution of Example 10 reduced the reactivity by more than 50% that of Example 1, showing that a 0.3 weight percent solution of sodium silicate is mildly effective. The 50 to 1 solution of Example 9 reduced the reactivity by more than 80%, showing that a 0.7 weight percent solution of sodium silicate is more than three times as effective as the 100 to 1 solution.

Figure 4:
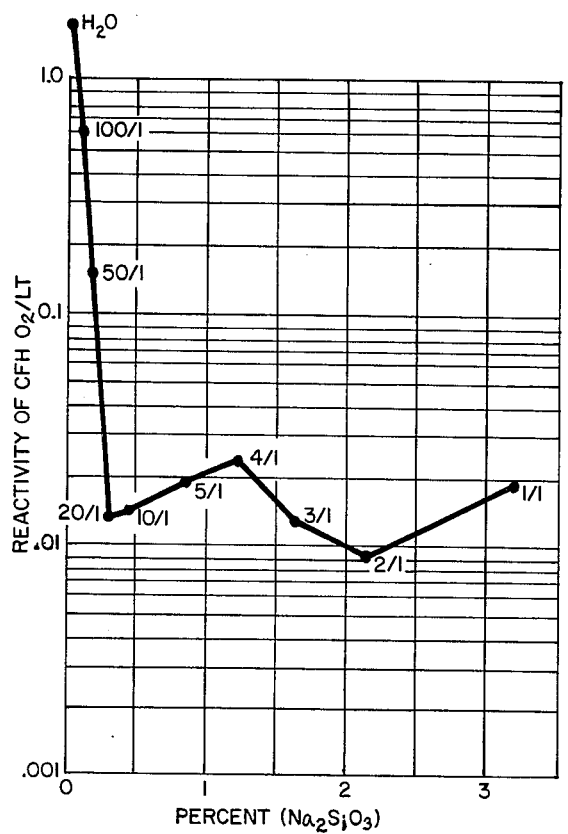
FIG. 4 is a logarithmically plotted graph comparing the reactivity of treated pellets to their weight gain from the treatment.

Note that while any amount of sodium silicate reduces the reactivity of the pellets, there is a sharp break in the curve of FIG. 4 at the 20 to 1 solution. Thus, the preferred range of the invention encompasses aqueous solutions containing at least 1.5 percent by weight of sodium silicate.

TABLE I

| Example | Ratio $H_2O$ to Liquid Sodium Silicate | Wt. % of Sodium Silicate | Weight Gain Wet | Weight Gain Dry | Wet Reactivity CFH $O_2$/LT |
|---|---|---|---|---|---|
| 1 | 1:0 | 0 | Not Measured | 0 | 1.25 |
| 2 | 1:1 | 18.8 | 15.55 | 3.15 | .014 |
| 3 | 2:1 | 12.5 | 14.46 | 2.01 | .009 |
| 4 | 3:1 | 9.4 | 14.25 | 1.54 | .012 |
| 5 | 4:1 | 7.52 | 13.83 | 1.13 | 0.024 |
| 6 | 5:1 | 6.27 | 13.69 | 0.86 | 0.019 |
| 7 | 10:1 | 3.42 | 13.26 | 0.38 | 0.015 |
| 8 | 20:1 | 1.79 | 13.34 | .26 | 0.016 |
| 9 | 50:1 | .74 | 13.17 | .15 | 0.17 |
| 10 | 100:1 | .37 | 13.41 | 0.06 | 0.61 |

EXAMPLES 11 THROUGH 14

Examples 11 through 14 show the effectiveness of the invented process in preventing reoxidation of dry sponge iron in air. Sponge iron pellets were immersed in a water solution of 10 parts water to 1 part liquid sodium silicate, then removed from the solution and dried by convection under oxidizing conditions in air at various temperatures. The reactivity in air of the dry treated sponge was then measured. This reactivity, expressed as cubic feet of oxygen consumed from air, per hour, per long ton of sponge (CFH $O_2$/LT) at 100° F is shown in Table 11, together with the typical reactivity of untreated sponge:

TABLE II

| Example No. | Drying Temperature | Reactivity in CFH $O_2$/LT Wet at 75° F | Dry at 150° F | Dry at 100° F |
|---|---|---|---|---|
| 11 | (Untreated) | 1.25 | 0.1677* | 0.0065 |
| 12 | 250° F (121° C) | 0.0082 | 0.0024 | 0.0001 |
| 13 | 325° F (163° C) | 0.0097 | 0.0018 | 0.0001 |
| 14 | 400° F (204° C) | 0.0375 | 0.0015 | 0.0001 |

*Measurement made at 125° F and adjusted to 150° F.

The dry reactivity of the treated sponge iron corresponds to a heating rate shown in Table III in °F per month if the sponge were put into a large bulk mass which cannot lose any heat. The corresponding loss in degree of metallization per month, due to reoxidation, is also shown in Table III.

TABLE III

| Example No. | Dry Reactivity CFH $O_2$/LT | Heating Rate ° F Per Month | Metallization Loss % Per Month |
|---|---|---|---|
| 11 | 0.1677 | 284 | 1.35 |
| 12 | 0.0024 | 4.1 | 0.019 |
| 13 | 0.0018 | 3.1 | 0.015 |

TABLE III-continued

| Example No. | Dry Reactivity CFH O₂/LT | Heating Rate ° F Per Month | Metallization Loss % Per Month |
| --- | --- | --- | --- |
| 14 | 0.0015 | 2.6 | 0.012 |

It has been experimentally determined that a drying temperature in a range up to 350° F is very effective when heated air is the drying medium. At a drying temperature of 400° F, the treatment is not quite as effective for passivation of pellets in the wet as well as in the dry state. It is believed the drying temperature should be substantially less than the auto-ignition temperature of sponge iron which is between 450° F and 500° F. Thus the drying temperature should not exceed 400° and is preferred not to exceed 350° F.

ALTERNATIVE EMBODIMENTS

As an alternative to dipping the sponge iron pellets in an alkali metal silicate solution, pellets can be dropped into a treatment solution tank and removed by conveyor, clam shell, or any other convenient means. The pellets also could pass through a quenching spray while remaining on a conveyor belt.

SUMMARY OF THE ACHIEVEMENT OF THE OBJECTS OF THE INVENTION

The results of the tests show that it is possible to render metallized iron pellets practically rust-resistant by a simple treatment with an aqueous solution of a water soluble alkali metal silicate. It is thus readily apparent that we have invented both a method of inhibiting rusting of metallic iron materials and a rust-resistant metallized iron pellet product.

What is claimed is:

1. A method of inhibiting oxidation of sponge iron consisting of contacting said sponge iron with a solution consisting of an aqueous solution of alkali metal silicate.

2. The method of claim 1 wherein said alkali metal is sodium.

3. The method of claim 2 wherein the aqueous solution contains at least 0.3 weight percent sodium silicate.

4. The method of claim 2 wherein the aqueous solution contains at least 0.7 weight percent sodium silicate.

5. The method of claim 4 wherein the aqueous solution contains at least 1.5 weight percent sodium silicate.

6. The method of claim 1 wherein said aqueous solution contacts said sponge iron as a quenching spray.

7. A method according to claim 1 wherein said sponge iron is immersed in said aqueous solution.

8. A method according to claim 1 wherein said sponge iron falls into said aqueous solution by gravity.

9. A method of preventing the generation of hydrogen when water contacts directly reduced metallized iron pellets consisting of treating said pellets with a water soluble alkali metal silicate by immersing said pellets in an aqueous solution of said alkali metal silicate, then removing the pellets from the solution.

10. A method according to claim 9 wherein said alkali metal is sodium.

11. A method according to claim 10 further comprising drying the pellets.

12. A method according to claim 11 wherein said treated pellets are dried by passing them through a heated furnace.

13. A method for preventing oxidation of sponge iron in air consisting of contacting sponge iron with a liquid sodium silicate, then drying said sponge iron under oxidizing conditions at a temperature substantially below the auto-ignition temperature of sponge iron.

14. A method according to claim 13 wherein said drying step is carried out at a temperature below about 400° F.

15. A method according to claim 13 wherein said drying step is carried out at a temperature below about 350° F.

16. A method according to claim 13 wherein said drying step is carried out at a temperature below about 250° F.

17. A method according to claim 13 wherein said sponge iron is dried by convection of air.

18. A method of manufacturing improved sponge iron consisting of the step of contacting sponge iron with a liquid consisting of an alkali metal silicate.

19. A method according to claim 18 wherein said liquid is a solution comprising sodium silicate.

20. A method according to claim 19 wherein said solution is aqueous.

21. A method of making improved sponge iron comprising the steps:
  a. reducing particulate iron ore; and
  b. contacting the reduced iron of step (a) with a liquid consisting solely of a water soluble alkali metal silicate capable of inhibiting oxidation of said reduced iron.

22. A method according to claim 21 wherein said liquid is a solution comprising said alkali metal silicate.

23. A method according to claim 22 wherein said alkali metal is sodium.

24. A method according to claim 23 wherein said solution is aqueous.

25. A method according to claim 21 further comprising drying the reduced iron of step (b).

26. A method of making a rust-resistant metallized iron pellet consisting of treating a directly reduced iron pellet by contacting said pellet with a solution consisting of an aqueous solution of an alkali metal silicate.

27. A method according to claim 26 wherein said alkali metal is sodium.

28. A metallized iron pellet suitable for long-term open storage in which the iron present is at least 80% in the metallic state, the remainder being present as iron oxide, said pellet being made by the method of claim 26.

29. A product according to claim 28 in which at least 90% of the iron present is in the metallic state.

30. An improved sponge iron consisting essentially of sponge iron and sodium silicate.

31. Improved sponge iron according to claim 30 resulting from the contacting of sponge iron with a liquid consisting of sodium silicate.

32. Improved sponge iron according to claim 31 wherein said liquid is a solution consisting of sodium silicate.

33. Improved sponge iron according to claim 32 wherein said solution is aqueous.

34. A method according to claim 2 further comprising drying said sponge iron under oxidizing conditions.

35. A method according to claim 20 further comprising drying said sponge iron under oxidizing conditions.

36. A method according to claim 25 wherein the drying step is carried out under oxidizing conditions.

37. A method according to claim 27 further comprising drying said sponge iron under oxidizing conditions.

38. Improved sponge iron according to claim 31 further resulting from the drying of said contacted sponge iron under oxidizing conditions.

* * * * *